Patented Nov. 11, 1930

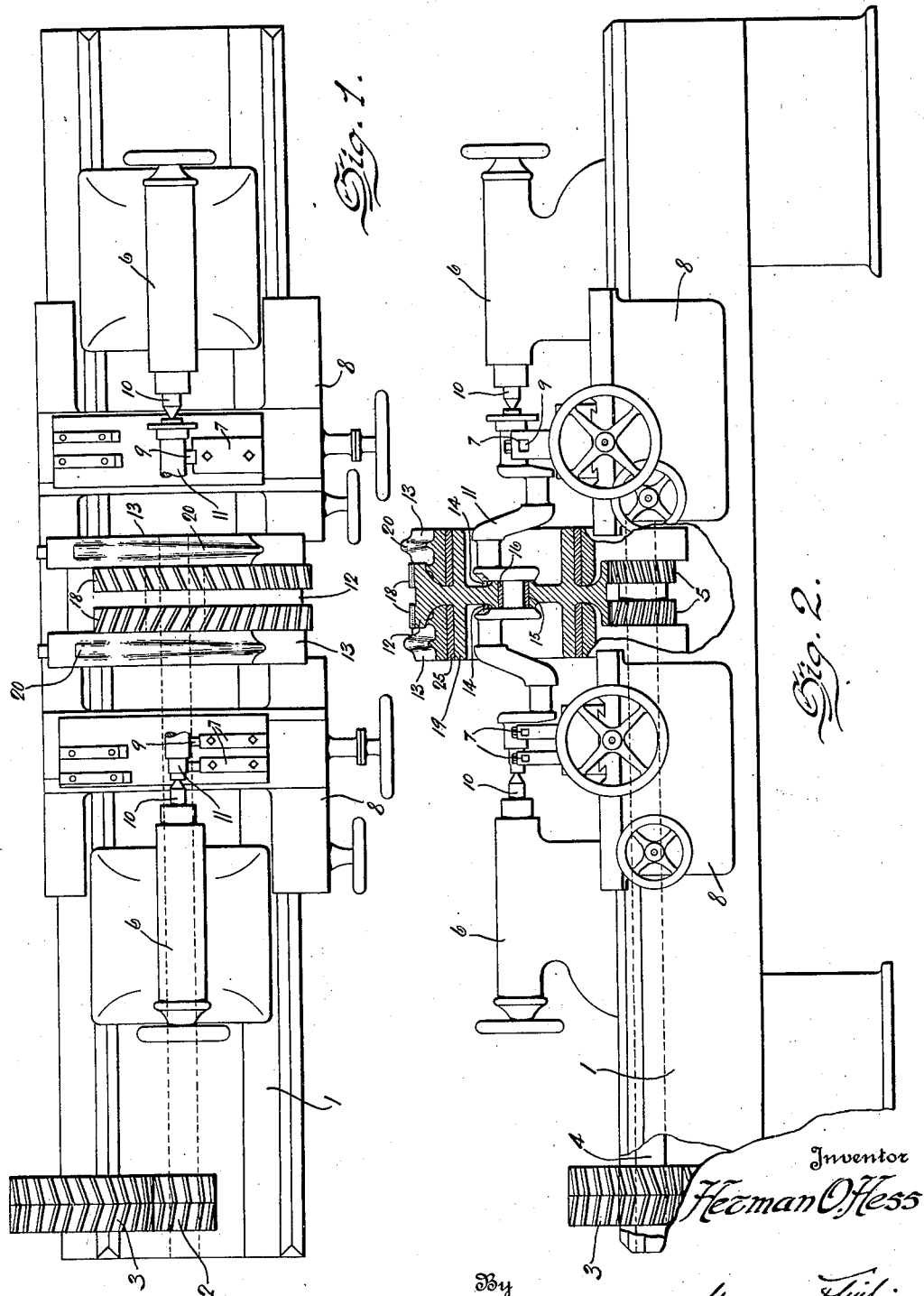

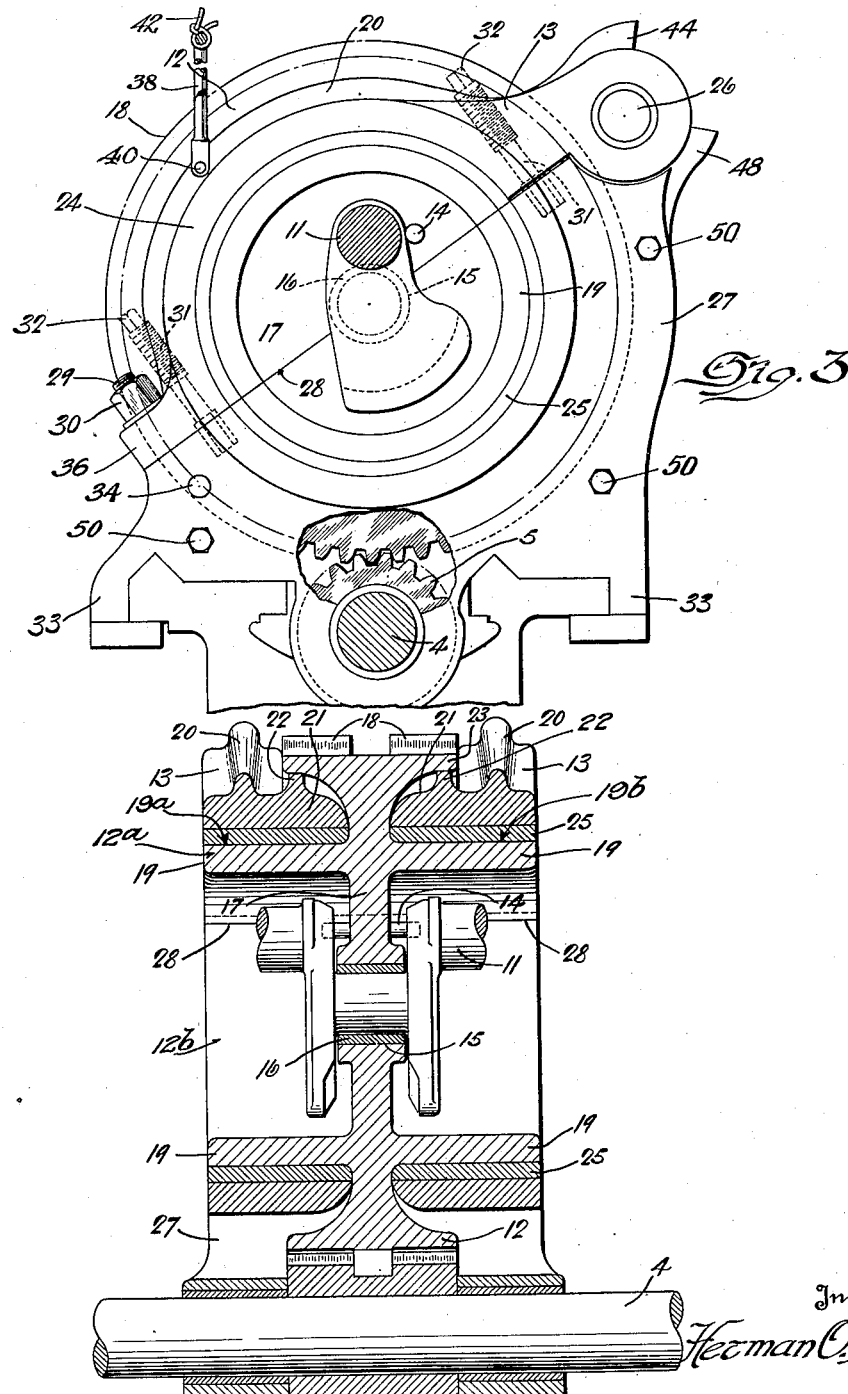

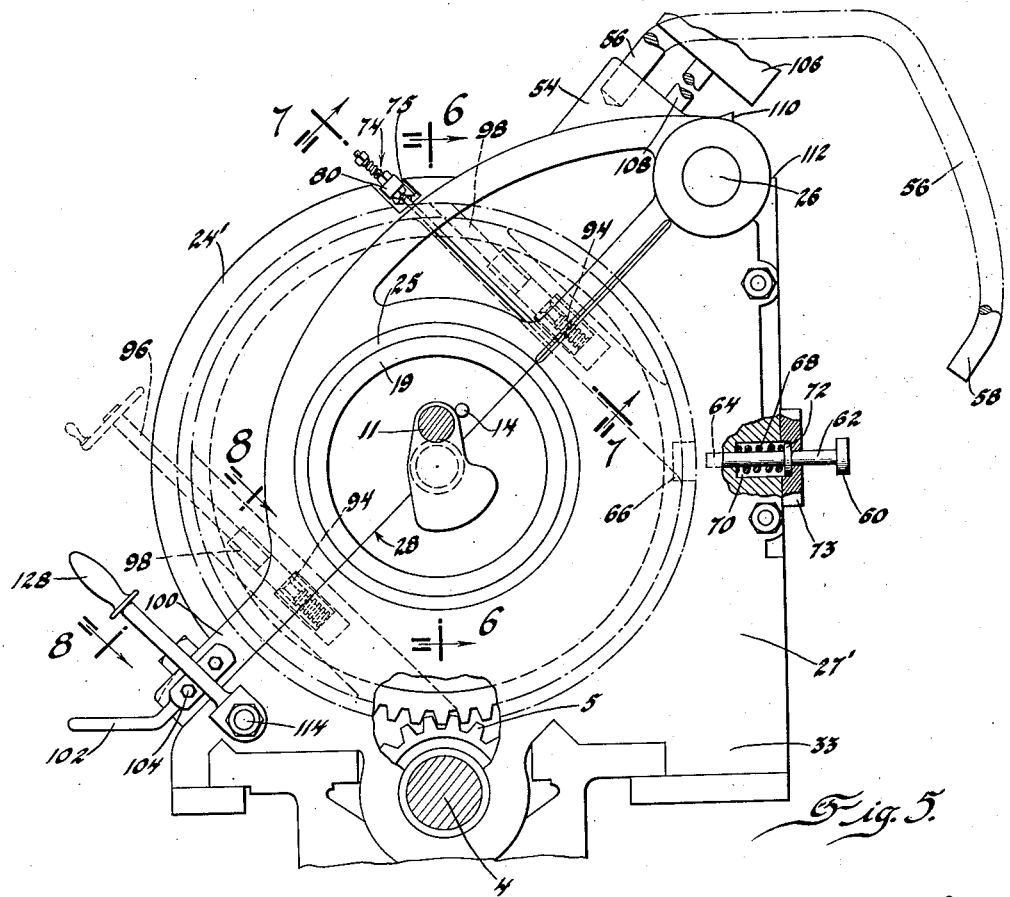

1,781,229

UNITED STATES PATENT OFFICE

HERMAN O. HESS, OF SAGINAW, MICHIGAN

LATHE FOR TURNING CRANK SHAFTS

Application filed September 18, 1929. Serial No. 393,778.

This invention relates to lathes, particularly those used in the truing of bearings and crank pins of multithrow crankshafts used on motor vehicles.

This application is a continuation in part of my prior application Serial No. 151,958, filed December 1, 1926.

Heretofore it has been the custom in turning crankshafts to use the ordinary lathe provided with the usual head and tail-stocks and turn or machine the bearing or crank pin at one end only and then remove the crankshaft from the lathe, place it in a second lathe where the other shaft end was finished. This necessitated two operations and a great deal of attendant cost for labor, tools, etc., and materially retarded production. It occurred to me that if a lathe were provided that was driven from the center and equipped with two tail-stocks, that both ends of a crankshaft could be turned at the same time by one machine. The disclosure of the present invention is the out-growth of this thought and results in the elimination of one operation, a speeding up of production and a very substantial reduction in operating expenses.

The particular embodiment of my invention comprises a large gear, diametrically split and confined by a similarly split and hinged bearing and handling member or steady-rest, and driven by any suitably arranged gearing. The work is placed in the split gear and is rotated by means of two lugs which project from the web of the gear and antifriction lining material is provided between broad flanges on the gear and the steady-rests. By unlocking the unhinged side of the handling member or steady-rest and swinging the upper half upon its hinge, the upper section of the gear is swung therewith and the crankshaft may then be inserted, after which the gear sector and swingable handling member or steady-rest may be replaced and the latter clamped onto the lower or rigid member.

According to one species of the invention the split bearing and handling member is composed of sectors one of which comprises a pair of mating sub-sectors pivoted at one side and adapted to swing on the pivot and to carry therewith one of the gear sectors to permit loading and unloading. The gear sectors have bilateral bearing portions which collectively provide bearing surfaces adapted to be engaged by the bearing and handling member. This member also underlaps the rim of the gear sectors to engage a bearing surface on the rim.

According to a second species of the invention the swingable handling member is integral and surrounds the gear and has a balancing weight applied to the rear thereof and a lifting handle at the front. The device is also equipped with means to retain the two gear halves stationary when they are in separated relation.

The lathe of the invention has no headstock but is equipped with two tail-stocks and has cutting tools at each stock which enable the finishing of both crank ends at one operation.

The invention is illustrated in the accompanying drawing in which

Figure 1 is a plan view of the lathe with a multi-throw axle shown held at the tail-stocks but broken away at its middle.

Figure 2 is a side elevation with parts in section, showing a crankshaft held by the central drive gear.

Figure 3 is an end view of the gear and steady-rests with parts in section.

Figure 4 is an enlarged vertical sectional view of the gear and steady-rests, showing a portion of a crankshaft held by the gear.

Figure 5 is a view similar to Figure 3 of a modification.

Figure 7:
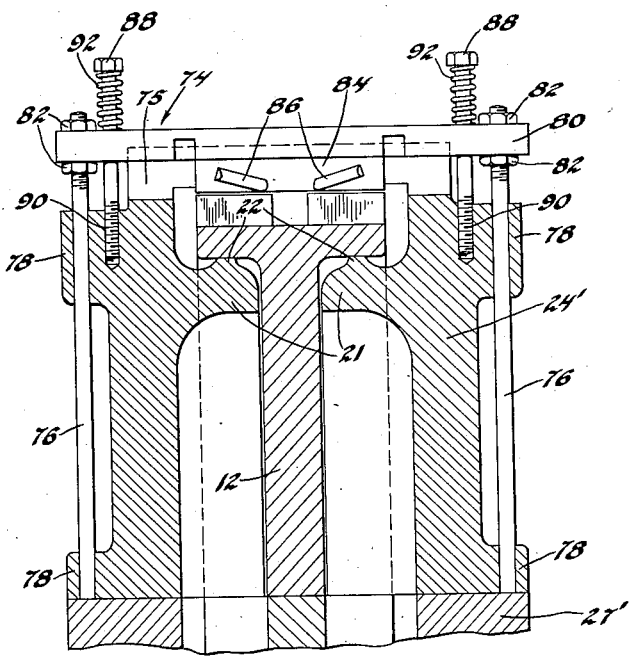
Figure 8:
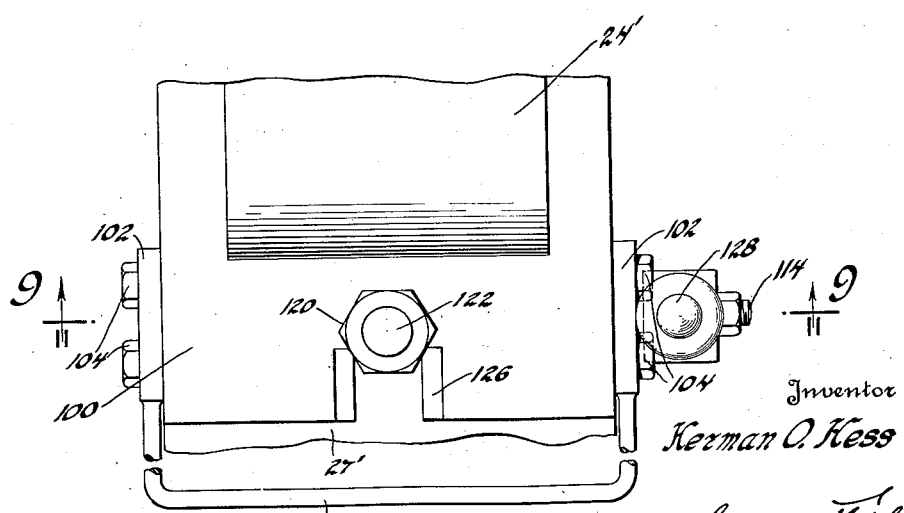

Figures 6, 7, 8 and 9 are sections on the lines 6—6, 7—7, 8—8 of Fig. 5 and 9—9 of Figure 8.

Referring to the drawing, 1 designates the novel lathe, 2 a gear receiving power from any suitable source and 3 a gear meshing therewith to drive a shaft 4 having the double gear 5 centrally arranged under the lathe. The tail-stocks are indicated by 6 and the cutting tool posts by 7. These posts are mounted upon the usual slides 8 and carry the customary cutting tools 9. The numeral 10 indicates the tailstock spindles between which is held the crankshaft 11 which is to be turned.

The driving gear 12 and the steady-rest or bearing and handling member 13 are placed at the center of the lathe as is seen from Figures 1 and 2 and the crankshaft is held in the central opening 15 of the gear 12 and this opening is provided with a split bushing 16 to reduce wear. The crankshaft is rotated or driven by means of two lugs or pins 14 which project from either side of the web 17 of the gear 12 substantially midway between the flanges 19 and the periphery of the opening 15 and engage the throws of the shaft as is seen from Figures 3 and 4. The gear 12 is split into sectors 12$^a$ and 12$^b$ and has a double toothed periphery 18, which engages with and is driven by the double gear 5.

Extending at right angles to the web 17 at both sides thereof are the bilateral broad annular flanges 19 which preferably are positioned radially substantially halfway between the peripheries of the opening 15 and the gear 12 and are encompassed by the bearing and handling member or split steady-rest 13, a part of which is arranged at each side of the gear to engage the corresponding flange 19. The gear sectors 12$^a$ and 12$^b$ therefor collectively provide bilateral bearing surfaces 19$^a$ and 19$^b$. The bearing and handling member or steady-rest 13 comprises upper and lower sets of bearing sectors 24 and 27. The upper hinged half or subsector 24 has strengthening ribs 20 and is composed of two halves positioned in vertical parallel and each half has a portion 21 extending inwardly of the gear 12, underlapping the rim 23 and overlapping the flange 19. The two swingable upper halves of the sector 24 are preferably rigidly secured together adjacent the hinged connection. An annular rib 22 on each of the lateral sections of the upper member 24 or steady-rest engages with the inner surface of the felly 23 to form an outwardly facing bearing and an antifriction lining 25 is placed between the flanges 19 and the steady-rest 13.

The upper subsector or bearing and handling member 24 is hinged as at 26 to the separately constructed lower halves 27 and both the bearing members or steady-rests 24 and 27 and the gear 12 are diametrically split as along the line 28, Figures 3 and 4. The unhinged side of the sectors or halves 24 and 27 is secured by means of bolts 29 and nuts 30 and spring actuated dowel pins 31, having squared heads 32, assist in centering and retaining the two halves to an accurate fit. The bolts 29 are mounted on the lower bearing halves 27 on trunnions 34 on which they are adapted to swing when the nuts 30 are partially unscrewed. The ends 36 of the steady-rests 13 are of course slotted to take care of the bolts 29.

The upper and lower sets of bearing and handling members 24 and 27 together form the bearing and handling member for the gear sectors 12$^a$ and 12$^b$ and the hinged member 24 is capable of lifting a gear sector therewith.

With the structure as above described it is evident that when the nuts 30 are unscrewed from the bolts 29 and the upper halves 24 of the steady-rests swung on their hinge 26, the top section of the gear 12 will likewise be raised, due regard of course having been had to see that the split in the gear 12 corresponds to the line 28 of Figures 3 and 4.

The lower halves 27 of the steady-rests have feet 33 which rest upon the base of the lathe and any suitable means may be adopted to rigidly secure these halves to the base.

A yoke 38 is pivotally attached as at 40 to the hinged sector 24. The purpose of this yoke is to permit the attachment of a cable or chain 42 operated from a suitable source of power, such as an overhead electric motor, to raise the hinged sector 24. The yoke 38 may be omitted and a weight attached to the hinged half 24 to balance the same on the pivot 26 and a handle applied to lift the swingable sector.

The two halves of the hinged sector 24 are preferably integrally constructed and are rigidly held together at their rear or hinged ends by means of the hinge block 44. The block 44 also serves as a limit stop by striking against the stop 48 on the lower bearing half 27. Bolts 50 are shown to hold the lower halves together and in proper position.

Figures 5 to 9 inclusive show a second species of the invention. The hinged bearing and handling member is indicated at 24′ and the stationary member at 27′. The two are hinged together at 26 as in the species shown in Figure 3. The bearing and handling member or steady-rest 24′ comprises one integral casting and extends over the periphery of the gear 12 as shown at 52 in Figure 6. The sector 24′ therefore completely encloses the upper half of the gear 12 and prevents the entry of dirt into the teeth of the gear and also protects the workmen from injury.

At the rear of the sector 24′ an integral boss 54 is provided. In the boss 54 there is secured one end of a curved arm 56, the free end 58 extends to the rear of the machine and is adapted to strike the head 60 of a plunger 62 when the sector 24′ is swung on its hinges. The plunger 62 is mounted at the rear of the stationary bearing and handling member 27′ and its end 64 is adapted to enter into an opening 66 in the lower gear half in order to hold the gear half from rotation when the sector 24 is swung on its hinges. A coil spring 68 housed in a recess 70 and held between the end of the recess and the collar 72 on the plunger 62 always tends to urge the plunger to the position shown in Figure 5. A cap 73 holds the plunger in place.

By referring to Figures 5 and 7 it will be seen that a means indicated as a whole at 74 has been provided to retain the upper gear half from rotation when it is moved with the bearing and handling member 24′. The means 74 operates through an opening 75 in the bearing and handling member 24′ and comprises lateral rods 76 passing through ribs 78 in the member 24′ and through openings in the bar 80, secured by means of the nuts 82 to the ends of each rod 76. The bar has formed thereon the extension 84 provided with a pair of teeth 86 which are adapted to fit between the teeth of the gear when the bar 80 is forced inwardly of the gear 12. A pair of bolts 88 are screw-threaded as at 90 to the member 24′ and pass through openings in the bar 80 and coil springs 92 are arranged between the heads of the bolts 88 and the upper side of the bar 80. The ends of the rods 76 strike against the lower bearing and handling member 27′ to raise the rods and bar 80 when the parts are in the operative position shown in Figures 5 and 7. When the bearing member 24′ is raised the rods 76 will move therewith which will permit the springs 92 to press the bar 80 and rods 76 downwardly to permit the teeth 86 to engage in the grooves of the teeth of the gear 12. This will prevent the upper gear half from rotating when the member 24′ is raised.

It is therefore apparent that when the sector 24′ is moved to raise the upper gear half, that the plunger 62 and the device 74 will prevent both gear halves from rotating or from moving out of the bearing and handling members 27′ and 24′.

At each side of the center of the gear and bearing and handling members, there is provided a screw-threaded member 94 adapted to be operated by a suitable tool 96 which extends into openings 98 in the upper member 24′ to engage in a squared hollow head of the screw members 94. By turning the screws inwardly they are adapted to engage in corresponding screw-threaded openings in the lower or stationary member 27′ to rigidly hold both bearing and handling members in position. To release the upper member 24′ the tool is reapplied and turned to unfasten the screws 94.

At the front of the bearing and handling member 24′, a fork 100 is provided. Secured to the two sides of the fork is the handle 102 by means of which the upper gear half is adapted to be raised. The handle 102 is secured by means of the bolts 104 applied at each side of the fork.

At the rear, the upper hinged half is provided with a balancing weight 106 secured by means of the rod 108. The rod 108 and weight 106 are of sufficient length and weight respectively to balance the swingable bearing and handling member 24′ on its pivot 26.

The hinged portion of the sector 24′ is provided with a stop 110 adapted to strike against a shoulder 112 on the stationary bearing and handling member 27′ to limit the throw of movement of the swingable bearing and handling member 24′.

Below the fork 100 at the front portion of the machine, the stationary bearing and handling member 27′ is provided with a suitably journaled shaft 114 having an eccentric portion 116 at its middle portion and conforming to the recess of the fork 100. Journaled on the eccentric portion 116 is a clamping bolt or member 118 having a nut 120 applied to its screw-threaded end 122. The bolt is reduced in diameter as shown at 124 and the fork has the outer edge portions removed as shown at 126 to allow for the bolt 118 to easily swing in and out of the fork 100. When in its final position the nut 120 will be rigidly clamped against the upper faces of the fork 100 to rigidly hold the sector 24′ in place. A handle 128 is keyed to the outer end of the shaft 114 and is adapted to swing the shaft to operate the bolt 118. The first operation of the handle 128 will rotate the eccentric to cause the bolt 118 to be raised after which the frictional contact between bolt 118 and eccentric 116 is sufficient to swing the bolt 122 and its nut 120 out of the recess in the fork 100. In actual practice, it is found that this arrangement is sufficient to hold the swinging bearing and handling member 24′ in position and it is therefore not necessary to use the threaded members 94. If desired, the members 94 may be entirely omitted but they are preferred in practice in case of injury to the fork 100 and its related mechanism.

The bearing and handling member 24′ is provided with the parts 21 and 22 and the bearing surfaces 19$^a$ and 19$^b$ as in the case of the species of Figures 3 and 4.

I claim:

1. In a lathe, a split driving gear having a laterally extending rim, flanges projecting from either side of said gear, and hinged split steady-rests serving as bearings for said flanges and extending under and contacting with the rim of the gear.

2. In a lathe, a split driving gear having a laterally extending rim, a web on said gear, annular flanges extending from said web, and hinged steady-rests serving as bearings for said flanges and underlapping the rim of said gear whereby one sector of said gear is bodily moved with the steady-rests when the latter are swung on their hinged connection.

3. In a lathe, a driving gear having a laterally extending rim, a flange on said gear, a bearing member for said gear embracing said flange and having an extension underlapping the rim of said gear and a rib on said extension bearing against said rim.

4. In a lathe for turning multi-throw crankshafts, a centrally arranged split driving gear, a web on said gear, and pin means projecting from said web to engage the throws of the crank to drive the same.

5. In a lathe, a driving gear diametrally split and having a central opening, a central web to said gear, and broad annular flanges projecting laterally from said gear, said flanges positioned radially substantially half-way between the peripheries of the opening and of the gear.

6. In a lathe, a driving gear diametrally split and having a central opening, a central web to said gear, broad annular flanges projecting laterally from said gear, said flanges positioned radially substantially half-way between the peripheries of the opening and of the gear, and a plurality of split steady-rests serving as bearings for said flanges.

7. In a lathe, a driving gear diametrally split and having a central opening, a central web to said gear, broad annular flanges projecting laterally from said gear, said flanges positioned radially substantially half-way between the peripheries of the opening and of the gear, a plurality of split hinged steady-rests serving as bearings for said flanges, and a projecting portion on said steady-rests underlapping the toothed portion of the gear whereby half of said split gear is moved with said steady-rests when the latter are swung on their hinges.

8. In a lathe, a split driving gear having a central opening and a central web, lateral flanges on said web, work engaging pins projecting from said web substantially midway between said opening and said flanges.

9. In a lathe, a split driving gear, a central web on said gear, flanges projecting from said web, and means for raising upwardly one sector of said gear from the other including a plurality of hinged steady-rests serving as bearings for said flanges.

10. In a lathe, a split driving gear, a web on said gear, broad annular flanges projecting from either side of said web at substantially one third the radial distance from the periphery of the gear, and means for raising one of the gear sectors from the other comprising a plurality of hinged steady-rests serving as bearings for said flanges.

11. In a lathe, a split driving gear, a central web on said gear having an opening concentric with its center for the reception of the work, annular flanges projecting from either side of said web at substantially one-half the radial distance between the central opening and the periphery of the gear, and means for raising one gear sector from the other including a plurality of hinged steady-rests serving as bearings for said flanges.

12. In a lathe, a split gear, annular flanges extending from both sides of said gear, and hinged steady-rests at both sides of said gear embracing said flanges and serving as bearings for said gear, said steady-rests capable of moving part of said gear when swung on their hinges.

13. In a lathe, a split gear, annular flanges extending from both sides of said gear, hinged steady-rests at both sides of said gear embracing said flanges and serving as bearings for said gear, and a rib on said steady-rests contacting with said rim, said steady-rests capable of moving part of said gear when swung on their hinges.

14. In a crankshaft lathe of the center drive type, a split gear member comprising gear sectors, bearing portions at both sides of said sectors, and a split bearing member including sets of bearing sectors conforming to the bearing portions on said gear sectors, said bearing sectors adapted to be positioned on said gear sector bearing surfaces and provided with annular means which laterally interfit with said gear sectors.

15. In a crankshaft lathe of the center drive type, a split gear member comprising gear sectors, bilateral bearing portions on said gear sectors, a split bearing member including sets of bearing sectors conforming to and adapted to engage the bearing portions of said gear sectors, and means for pivotally mounting one set of bearing sectors.

16. In a crankshaft lathe of the center drive type, a split gear member including gear sectors, bilateral bearing portions on said sectors, and a split bearing member comprising sets of bearing sectors conforming to and engaging said bilateral bearing portions, said split bearing member including at least one substantially cylindrical surface.

17. In a crankshaft lathe of the center drive type, a split gear member comprising gear sectors, bearing portions on both sides of said gear sectors, and a split bearing member comprising sets of bearing sectors which provide bearings conforming to said gear sector bearings portions, said split bearing members including an outwardly facing and an inwardly facing bearing surface.

18. In a crankshaft lathe of the center drive type, a split gear member comprising gear sectors, said sectors collectively providing bilateral bearing surfaces, and a split bearing member including sets of bearing sectors which provide bearings adapted to engage said bilateral bearing surfaces, one of said members comprising a mating pair of subsidiary subsectors.

19. In a crankshaft lathe of the center drive type, a split work-receiving gear member comprising sectors, a split bearing and handling member for said gear member, one of said members constituting means to lift a corresponding sector of the other of said members.

20. In a lathe, a split bearing and handling member, a split gear, one portion of said split bearing member being movable and adapted to raise one portion of said gear therewith, means for counterbalancing said movable bearing portion, and a handle on said movable portion to raise the same.

21. In a crankshaft lathe of the center drive type, a gear member comprising sectors, and a bearing and handling member for said gear member, said bearing and handling member also comprising sectors, one of said members including subsectors positioned in vertical parallel on opposite sides of and interfitting with a sector of the other member so as to render a gear sector removable by means of a bearing sector.

22. In a device of the class described, a gear divided into sectors and provided with means for the reception of the work, bearing means for said gear, and means for pivotally mounting a portion of said bearing means relative to the remainder, said pivoted portion engaged with a gear sector to cause the latter to be lifted with the pivoted bearing portion when said bearing portion is moved on its hinge to thereby permit the insertion or removal of the work.

In testimony whereof I affix my signature.

HERMAN O. HESS.